April 21, 1953   S. R. HAWKINS   2,635,504
MICROSCOPE
Filed April 23, 1951

Inventor
SYDNEY R. HAWKINS
By Emery, Holcombe & Blair
Attorneys

Patented Apr. 21, 1953

2,635,504

UNITED STATES PATENT OFFICE 2,635,504

MICROSCOPE

Sydney Ronald Hawkins, North Finchley,
London, England

Application April 23, 1951, Serial No. 222,404
In Great Britain April 27, 1950

3 Claims. (Cl. 88—39)

1

This invention relates to microscopes. Its principal object is the provision of a simple instrument which is cheaply constructed and is readily portable. A further object is the provision of a microscope constructed from a very small number of components.

Yet a further object is to mount the three essential components, namely the eyepiece, a support for an object to be viewed and the reflector for illuminating the object under examination on a single frame forming part of the casing of the instrument. Still another object is to form the reflector, a clip for holding an object to be viewed and a second clip to hold a slide within the casing of the instrument during transit, from a single metal plate secured to the frame.

A further object is to provide such a microscope with a lid which may be folded back to form a stand for the instrument under operating conditions. Still further objects will be apparent from the following description of a microscope in accordance with the invention, with reference to the annexed drawings, in which.

Figure 2:
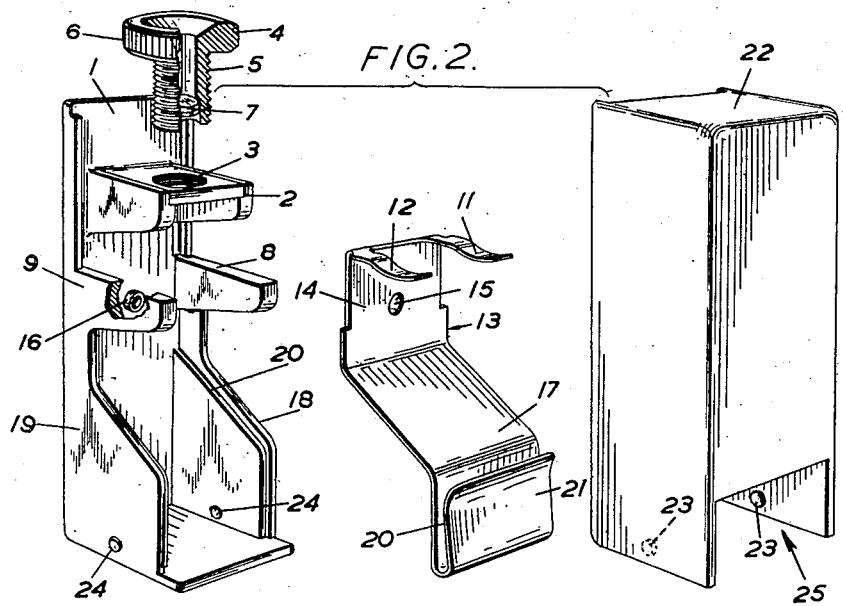
Figure 2 is a perspective view similar to Figure 1, but showing the various components exploded and with certain parts cut away for purposes of illustration.

The instrument comprises a framework in the form of a flat rectangular tray 1 moulded from a synthetic plastic material, such as cellulose acetate or polystyrene and forming a mounting for the three essential components of the instrument. Close to the top of this framework is a projecting bracket 2 formed with a central threaded bore 3 within which the eyepiece 4 may be screwed for purposes of adjustment. The eyepiece comprises a hollow threaded stem 5 formed with a knurled flange 6. A lens 7 is situated towards the bottom of the central bore. Although in the example illustrated only a single lens is shown, the eyepiece may comprise two or more such lenses. In order to focus the eyepiece, it may be screwed up and down within the aperture 3 and, if desired, it may be completely removed as shown in Figure 2. In this way, a number of interchangeable eyepieces may be supplied with each instrument.

Figure 1:
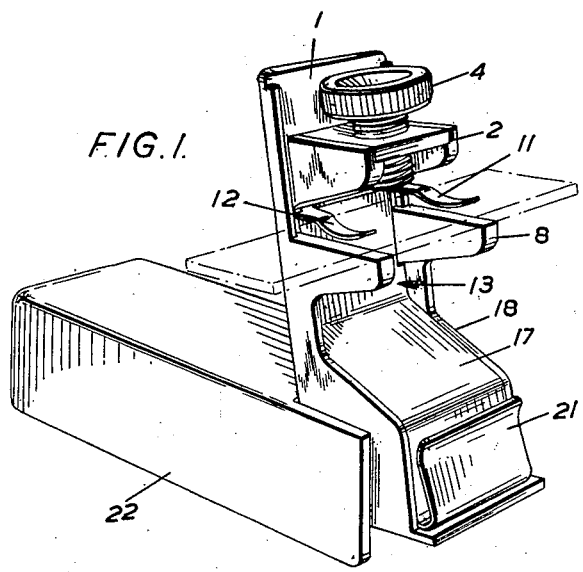
Figure 1 is a perspective view of the instrument in its open position ready for use.

Beneath the bracket 2 are a pair of arms 8 and 9 forming a support for an object to be viewed. In general, this object will be mounted on a glass slide 10 as shown in Figure 1, and

2 this slide is then supported by the two arms 8 and 9. The slide is held in position on the support by means of a resilient spring clip consisting of a pair of bowed fingers 11 and 12. These fingers extend from a metal plate shown generally at 13 and seen best in Figure 2. Beneath the fingers 11 and 12 the plate is formed with a flat portion 14 which seats against the surface of the framework 1 where it is held in position by means of a screw passing through a hole 15 into a corresponding threaded bushing 16 in the frame 1.

Beneath the portion 14 the plate extends forwardly at an angle in the region of 45 degrees at 17 to constitute the reflector of the instrument. This portion of the plate is highly polished so as to have good reflecting qualities. The reflector portion 17 of the plate 13 seats on projections 18 and 19 cut away at a corresponding angle. These projections are formed with a ridge 20 to ensure the correct location of the plate 13.

Figure 3:
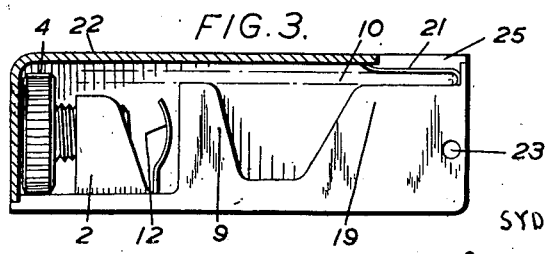
Figure 3 is a view of the instrument in its closed position showing the lid in section.

Beyond the reflector portion 17 the plate 13 extends downwardly at 20 to seat on the fronts of the projecting portions 18 and 19, and is then bent back on itself at 21 to form a further resilient clip for holding a slide during transit. The position of the slide 10 during transit is shown in Figure 3, from which it will be seen that the slide lies snugly along the length of the instrument where it is held against vibration by the clip portion 21.

The instrument is provided with a box-shaped lid 22, pivoted to it close to the bottom by means of rivets 23 engaging recesses 24. The lid 22 is formed with a cut away portion 25 which enables it to be swung from its closed position shown in Figure 3 through slightly more than three right angles to form a base for the instrument when in the operating position as shown in Figure 1. When in this position, the framework 1 of the instrument leans back slightly from the vertical to provide a convenient viewing angle. When the lid 22 is in the closed position, the cut away portion 25 is closed by the clip portion 21 of the plate 13 so that the instrument is totally enclosed.

It will be appreciated that the instrument is of extremely simple construction, having only four main components as seen from Figure 2. The main framework 1, together with various portions extending from it, may be formed as a single plastic moulding as can also the lid 22. The eyepiece 4 can be made either from turned metal, or alternatively, it also can be made as a plastic moulding. Finally, the plate 13 can be stamped out from sheet brass and plated to provide a good reflecting surface, after which it is simply shaped by a small number of pressing operations. Only a single screw is needed to hold this plate in position and the remainder of the instrument is assembled by riveting the lid into position and screwing the eyepiece in place.

Such an instrument is readily portable and in its closed position can be carried in the pocket. Although it is of an extremely simple nature, it can nevertheless be used for scientific work either by school children or alternatively by scientific workers in the field, who are unable to carry around a heavy instrument and who require only relatively low degrees of magnification.

I claim:

1. A portable microscope comprising in combination an elongated open frame, a bracket integral with and close to one end of said frame and formed with a threaded bore, an eyepiece screwed into said bore, supporting means integral with and projecting from said frame for supporting an object to be viewed and a metal plate secured to said frame, said plate comprising a plane polished portion serving as a reflector spaced from said supporting means and in alinement with said supporting means and said bore for illuminating an object to be viewed and a resilient portion adjacent and substantially parallel to said supporting means for holding an object to be viewed thereon, and a lid forming with said frame a casing enclosing said eyepiece, supporting means and plate.

2. A portable microscope comprising in combination, a rectangular tray, a bracket integral with and close to the upper end of said tray, an eyepiece adjustably mounted in said bracket, supporting means integral with and projecting from said tray beneath said eyepiece for supporting an object to be viewed, a resilient clip for holding the object on said support, a polished metal reflector secured to said tray beneath said supporting means, a box-like lid constituting with said tray a casing for said microscope, said lid being formed at one end with a cut-away portion, and hinge means securing said lid to the lower end of said tray, said lid being swingable about said hinge means from a position in which it encloses said microscope to a position in which it forms an operating base.

3. A portable microscope comprising in combination, a rectangular tray, a bracket integral with and close to the upper end of said tray, said bracket being formed with a threaded bore, an eyepiece comprising a threaded sleeve formed with a knurled rim and a lens enclosed within said sleeve, said sleeve being adjustably screwed into said bore, a pair of arms integral with and projecting from said tray beneath said eyepiece, a metal plate comprising a portion constituting a pair of resilient fingers overlying said arms and an inclined polished reflector portion, means for attaching said plate to said tray, a pair of inclined seating portions projecting from said tray for locating said reflector portion of said plate, a box-like lid constituting with said tray a casing for said microscope, said lid being formed at one end with a cut-away portion, and hinge means securing said lid to the lower end of said tray, said lid being swingable about said hinge means from a position in which it encloses said microscope to a position in which it forms an operating base.

SYDNEY RONALD HAWKINS.

References Cited in the file of this patent

UNITED STATES PATENTS

| Number | Name | Date |
|---|---|---|
| 513,912 | Gardam | Jan. 30, 1894 |
| 1,568,088 | Rosenstein | Jan. 5, 1926 |
| 2,110,653 | Powell | Mar. 8, 1938 |
| 2,157,157 | Anketell | May 9, 1939 |

FOREIGN PATENTS

| Number | Country | Date |
|---|---|---|
| 598,977 | Germany | June 22, 1934 |